(12) United States Patent
Goulet

(10) Patent No.: US 7,205,509 B2
(45) Date of Patent: Apr. 17, 2007

(54) HEATED FOOD SERVING APPARATUS AND METHOD THEREFOR

(76) Inventor: N. Kay Goulet, 2922 W. Colton Ave., North Las Vegas, NV (US) 89032

( * ) Notice: Subject to any disclaimer, the term of this patent is extended or adjusted under 35 U.S.C. 154(b) by 0 days.

(21) Appl. No.: 10/831,055

(22) Filed: Apr. 26, 2004

(65) Prior Publication Data

US 2005/0247698 A1 Nov. 10, 2005

(51) Int. Cl.
*H05B 3/06* (2006.01)
(52) U.S. Cl. ...................................... 219/521
(58) Field of Classification Search ............... 219/200, 219/227, 242, 521; 99/342; 425/187, 277, 425/279; 126/39 E, 38, 92 AC, 41 R, 40, 126/50, 237, 238, 229, 233, 239, 231; 431/253, 431/255, 344
See application file for complete search history.

(56) References Cited

U.S. PATENT DOCUMENTS

| | | | | |
|---|---|---|---|---|
| 3,513,290 | A | * | 5/1970 | Burley et al. ............... 219/242 |
| 3,984,738 | A | * | 10/1976 | Mohr .......................... 361/260 |
| 3,992,604 | A | * | 11/1976 | Leddy ......................... 219/227 |
| 4,701,597 | A | * | 10/1987 | Braun et al. ................ 219/521 |
| 5,000,672 | A | * | 3/1991 | Halimi ........................ 425/279 |
| 5,131,832 | A | * | 7/1992 | Budreau ...................... 425/277 |
| 5,326,248 | A | * | 7/1994 | Thuecks et al. ............. 425/187 |
| 2002/0073853 | A1 | * | 6/2002 | Norcross ..................... 99/342 |

FOREIGN PATENT DOCUMENTS

| | | | |
|---|---|---|---|
| GB | 2180052 | * | 3/1987 |
| GB | 2388300 | * | 12/2003 |
| WO | WO2004000082 | * | 12/2003 |

* cited by examiner

*Primary Examiner*—Robin Evans
*Assistant Examiner*—Vinod Patel
(74) *Attorney, Agent, or Firm*—Harry M. Weiss; Weiss & Moy, P.C.

(57) ABSTRACT

An apparatus for both heating and serving food has both an interchangeable heat conducting food serving assembly and a heat exchange assembly coupled to at least a portion of the interchangeable heat conducting food serving assembly. A head portion of the interchangeable heat conducting food serving assembly is at least one of a scoop, a fork, a ladle and a knife. The interchangeable heat conducting food serving assembly serving assembly is heated by the heat exchange assembly, facilitating serving the food in contact with the interchangeable heat conducting food serving assembly. A head portion of the interchangeable heat conducting food serving assembly is at least one of a scoop, a fork, a ladle and a knife. A stand holds the apparatus and disperses heat to mitigate excess temperature build-up while the apparatus is not in use.

1 Claim, 6 Drawing Sheets

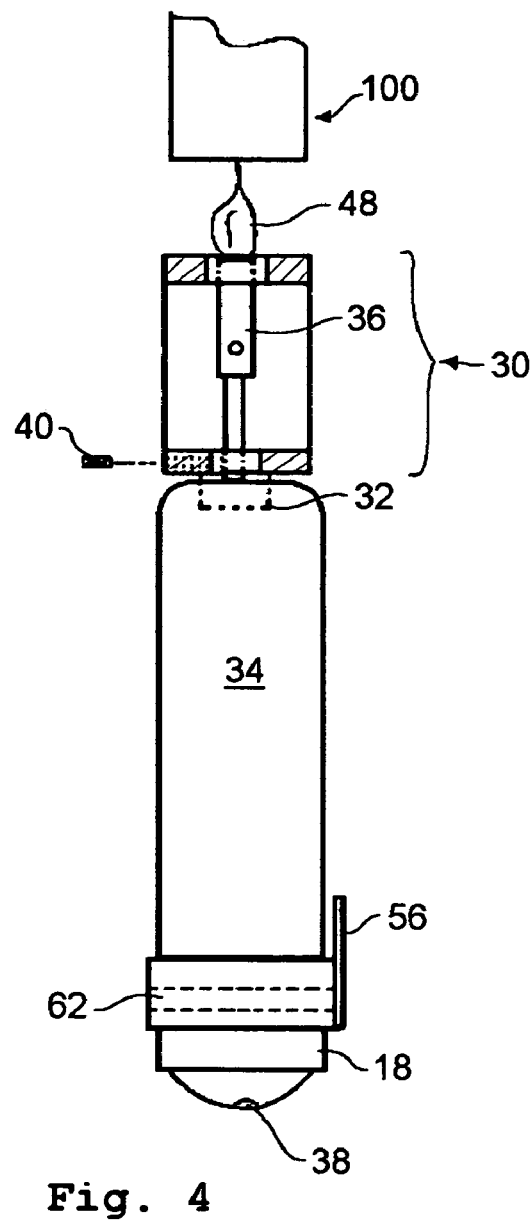
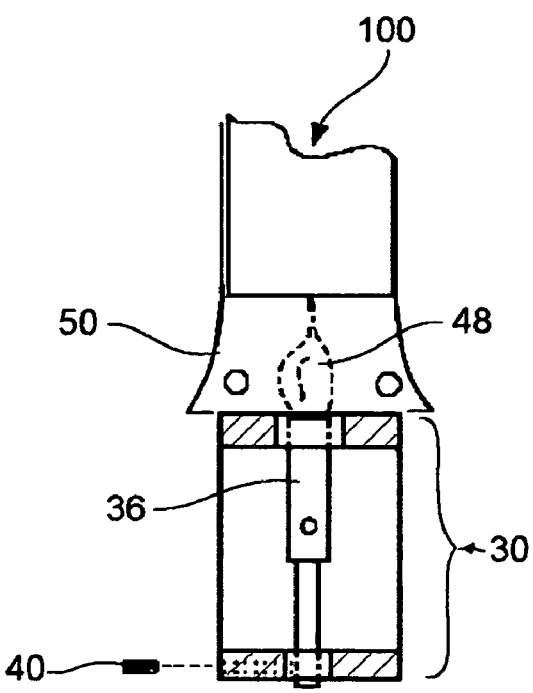
Fig. 4
Fig. 4A

HEATED FOOD SERVING APPARATUS AND METHOD THEREFOR

FIELD OF THE INVENTION

This invention relates generally to food serving apparatus and more specifically to improved heated food serving apparatus having interchangeable food serving assemblies that are heated and method therefor.

BACKGROUND OF THE INVENTION

In the past, various heated ice cream scoop devices have been described. A need for such a device for serving a cold confectionary product such as ice cream arises from the difficulty that retailers have in serving numerous scoops to their clients. Often an ice cream scoop is dipped in water after each serving of ice cream to clean off the scoop and to partially warm the scoop to make it easier to provide another scoop of ice cream. However, each time the ice cream scoop is dipped in water, some of the water transfers with the ice cream scoop making the resulting product less palatable because of the ice formed on the scoop of ice cream.

Anderson, U.S. Pat. No. 3,476,059 utilizes electrical resistance elements mounted within a scoop structure. Leddy, U.S. Pat. No. 3,992,604 provides a further example of an electrically heated ice cream dispenser organization. Lamphere and Spector U.S. Pat. No. 4,553,921 provide yet another electrically heated ice cream scoop comprising a scoop portion, a handle portion, means (electrical through an element and a power cord) for heating the scoop portion, means for controlling the temperature in the scoop portion and a stand built into the handle portion to support the scoop portion when not being used.

Budreau, U.S. Pat. No. 5,131,832 disclosed an ice cream scoop including a ladle formed within an interior wall and exterior wall defining a heat chamber therebetween, and with the heating chamber including a vent through the exterior wall diametrically opposed to an elongated handle, with the handle including a heating assembly for mounting a heating cartridge (such-as a cigarette lighter), thereby directing heated air supply between the interior and exterior walls of the scoop.

Virkler, U.S. Pat. No. 5,837,296 disclosed a water heated ice cream scoop wherein the ice cream scoop comprises a hollow chamber throughout the ice cream scoop, which is filled with heated water and emptied on a regular basis through a cap on a portion of the ice cream scoop.

Vidmar et al., U.S. Pat. No. 6,239,417 disclosed a microwave heated serving utensil for serving a frozen confection including a bowl portion formed from a substantially rigid material that becomes heated when subjected to microwave radiation and further including a handle portion attached to the bowl portion, formed from a substantially rigid material that substantially restricts the absorption of microwave energy.

Each of the previously described ice cream scoops have limitations, and most important, are limited to a single use. A need still exists for an improved heated food serving apparatus for frozen confections. The inventor of this application provides such an improved heated food serving apparatus having detachable heads allowing for multiple uses of the heated food serving apparatus. Specifically, the head may be a scoop, a fork, a ladle and a knife, which permits a user of the heated food serving apparatus to both scoop a frozen confection and serve the frozen confection when it is made up into various forms, such as a cake or a roll. Accordingly, it will be apparent to those skilled in the art that this inventor's heated food serving apparatus is an improvement over the previously described heated ice cream scoops and also provides for multiple uses.

SUMMARY OF THE INVENTION

Accordingly, it is an object of this disclosure to provide an improved heated food serving apparatus.

It is a further object of this disclosure to provide a plurality of detachable heads for use with the improved heated food serving apparatus.

It is a still further object of this disclosure to provide a heat sink stand for use with the improved heated food serving apparatus.

It is a further object of this disclosure to provide methods for using the improved heated food serving apparatus.

PREFERRED EMBODIMENTS OF THE INVENTION

In accordance with one embodiment of this invention, an apparatus for both heating and serving food comprises, in combination, an interchangeable heat conducting food serving assembly; and means coupled to at least a portion of the interchangeable heat conducting food serving assembly for heating the interchangeable heat conducting food serving assembly, thereby heating food in contact therewith to facilitate serving the food in contact with the interchangeable heat conducting food serving assembly. The apparatus further comprises a stand for holding the apparatus, the stand dispersing heat to mitigate excess temperature build-up while the apparatus is not in use.

In accordance with a second embodiment of this invention, a heated food serving apparatus for a frozen dessert comprises, in combination, an interchangeable heat conducting food serving assembly and a heat exchange assembly; the interchangeable heat conducting food serving assembly including a head portion and a protruding portion, the protruding portion of the interchangeable heat conducting food serving assembly detachably coupled to a heat exchange assembly provided for heating the head portion of the interchangeable heat conducting food serving assembly. The head portion of the interchangeable heat conducting food serving assembly is at least one of a scoop, a fork, a ladle and a knife.

In accordance with a third embodiment of this invention, a method for serving a frozen dessert using a heat food serving apparatus comprises the steps of providing an interchangeable heat conducting food serving assembly; and providing means coupled to at least a portion of the interchangeable heat conducting food serving assembly for heating the interchangeable heat conducting food serving assembly, thereby heating food in contact therewith to facilitate serving the food in contact with the interchangeable heat conducting food serving assembly. The method further comprises the steps of providing a head portion of the interchangeable heat conducting food serving assembly is at least one of a scoop, a fork, a ladle and a knife; coupling a protruding portion of the interchangeable heat conducting food serving assembly to a ledge of the heat exchange assembly; rotating a control knob to initiate ignition of a flammable gas; raising the temperature of the head portion of the heat conducting food serving assembly with a flame; and serving the frozen dessert with the heated head portion of the interchangeable heat conducting food serving assembly.

The foregoing and other objects, features, and advantages of the invention will be apparent from the following, more detailed description of the preferred embodiments of the invention, as illustrated in the accompanying drawings.

BRIEF DESCRIPTION OF THE DRAWINGS

FIG. 4 is an elevational view of an interior portion of the handle of the heated food serving apparatus of FIG. 1 showing the temperature control knob having an access hole in a portion of the temperature control knob for refilling the refillable gas container, the refillable gas container coupled to the heat exchange assembly including a gas valve and the torch unit having a flame for heating a portion of the interchangeable heat conducting food serving assembly.

FIG. 4A is an exploded elevational view of the heat exchange assembly of the heated food serving apparatus of FIG. 4 including the torch unit of the heat exchange assembly and the flame enclosed by a flame shield, with the flame heating a portion of the interchangeable heat conducting food serving assembly.

DESCRIPTION OF THE INVENTION

It is understood that the word serving means cutting, removing or extracting food according to the various embodiments described (see below) in this application.

Figure 1:
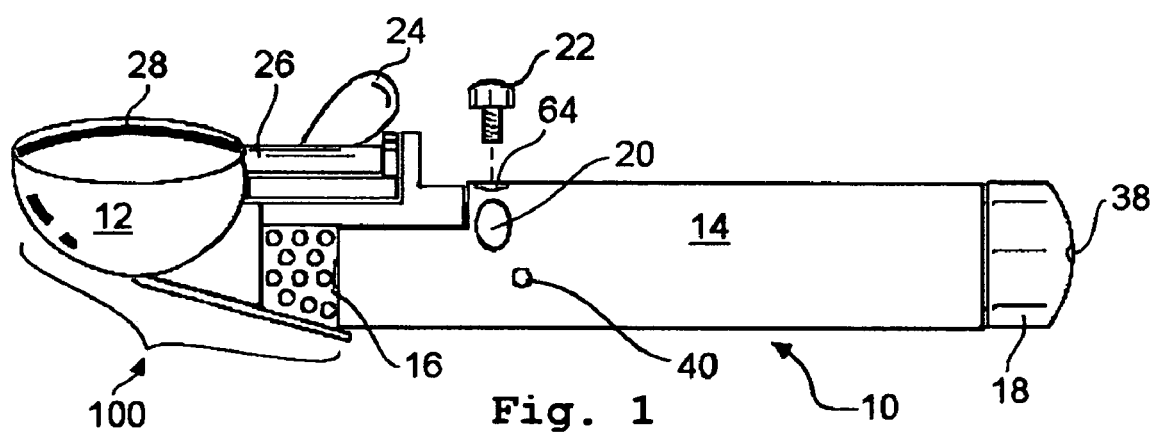
FIG. 1 is a perspective view of a heated food serving apparatus showing one embodiment of an interchangeable heat conducting food serving assembly comprising a scoop-shaped head portion and a heat shield with the interchangeable heat conducting food serving assembly detachably coupled to a portion of one end of a handle with a temperature control knob located at an opposite end of the handle according to the present invention.

According to FIG. 1, a heated food serving apparatus 10 comprises an interchangeable heat conducting food serving assembly 100 having a first end and a second end and a handle 14 having a first end and a second end. The second end of the interchangeable heat conducting food serving assembly 100 is detachable from first end of the handle 14. In one embodiment, the interchangeable heat conducting food serving assembly 100 further comprises a scoop-shaped head portion 12 located at the first end of the interchangeable heat conducting food serving assembly 100, a heat shield 16 located on a portion of the second end of the interchangeable heat conducting food serving assembly 100 so that when the interchangeable heat conducting food serving assembly 100 is coupled to the handle 14, the heat shield 16 is proximate to the first end of the handle 14. The interchangeable heat conducting food serving assembly 100 further comprises a lever 24 coupled to a driveshaft 26 for guiding a substantially semi-circular wire 28 inside an inner portion of the head portion 12 of the heated food serving apparatus 10. A portion of the second end of the interchangeable heat conducting food serving assembly 100 includes a protruding portion 44 having a threaded hole 42. A portion of the first end of the handle 14 includes a thumb screw opening 64 and the threaded hole 42 of the protruding portion 44 of the interchangeable heat conducting food serving assembly 100 is aligned to the thumb screw opening 64. A thumb screw 22 passes through the thumb screw opening 64 of the handle 14 and detachably couples a portion of the handle 14 to the protruding portion 44 of the interchangeable heat conducting food serving assembly 100 having the threaded hole 42 (see FIGS. 1, 2, 3, 5 and 6). A portion of the handle 14 further comprises a temperature indicating display 20 for indicating the temperature of the interchangeable heat conducting food serving assembly 100 when heated by a torch unit 36 (see FIGS. 2, 4, 4A and 5). The temperature of the interchangeable heat conducting food serving assembly 100 is adjusted by rotating a temperature control knob 18 located at the second end of the handle 14. The interchangeable heat conducting food serving assembly 100 is preferably heated to a temperature greater than about 100° F., although temperatures of at least about 100° F. and greater than about 120° F. may be effective. An outer portion of the handle 14 is coupled to a substantially cylindrical sleeve 54 (see FIG. 5) of the handle 14 by a locking screw 40. The sleeve 54 is concentric with a substantially cylindrical refillable gas container 34 having a first end and a second end (see FIGS. 2 and 4). The gas container 34 encloses a flammable gas such as butane and the like. The temperature control knob 18 has an access hole 38 (see FIGS. 1, 2, 4 and 5) for refilling the gas container 34 from a gas dispenser (not shown).

Figure 2:
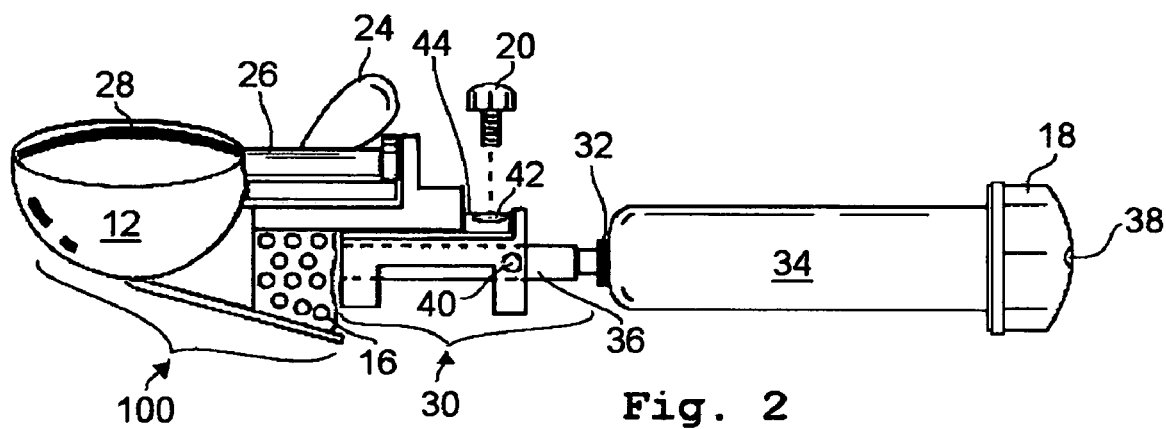
FIG. 2 is a perspective view of the heated food serving apparatus of FIG. 1 showing an inner portion of the handle comprising a substantially cylindrical refillable gas container coupled to a heat exchange assembly having a torch unit and the heat exchange assembly detachably coupled to one embodiment of the interchangeable heat conducting food serving assembly.

Referring to FIG. 2, an inner portion of the handle 14 of the heated food serving apparatus 10 comprises the substantially cylindrical refillable gas container 34 and a heat exchange assembly 30 having a first end and a second end. The second end of the heat exchange assembly 30 is coupled to the first end of the gas container 34. The heat exchange assembly 30 comprises the torch unit 36 at the first end of the heat exchange assembly 30. The interchangeable heat conducting food serving assembly 100 is fixedly coupled to the second end of the heat exchange assembly 30 by means of the thumb screw 22 coupled to the threaded hole 42 in a portion of the protruding portion 44 (see description above). A ledge 52 (see FIGS. 2, 5 and 6) of the heat exchange assembly 30 is provided for receiving the protruding portion 44 of the interchangeable heat conducting food serving assembly 100. A gas valve 32 located between the second end of the heat exchange assembly 30 and the first end of the gas container 34 (see FIGS. 2, 4 and 4A) provides variable amounts of gas for fueling the torch unit 36 when the temperature control knob 18 is rotated. A portion of the gas valve 32 proximate to the second end of the heat exchange assembly 30 is secured with the locking screw 40 (see FIGS. 2, 4 and 4A), so that the gas container 34 also rotates when the temperature control knob 18 is rotated to control the amount of gas entering the torch unit 36.

Figure 3:
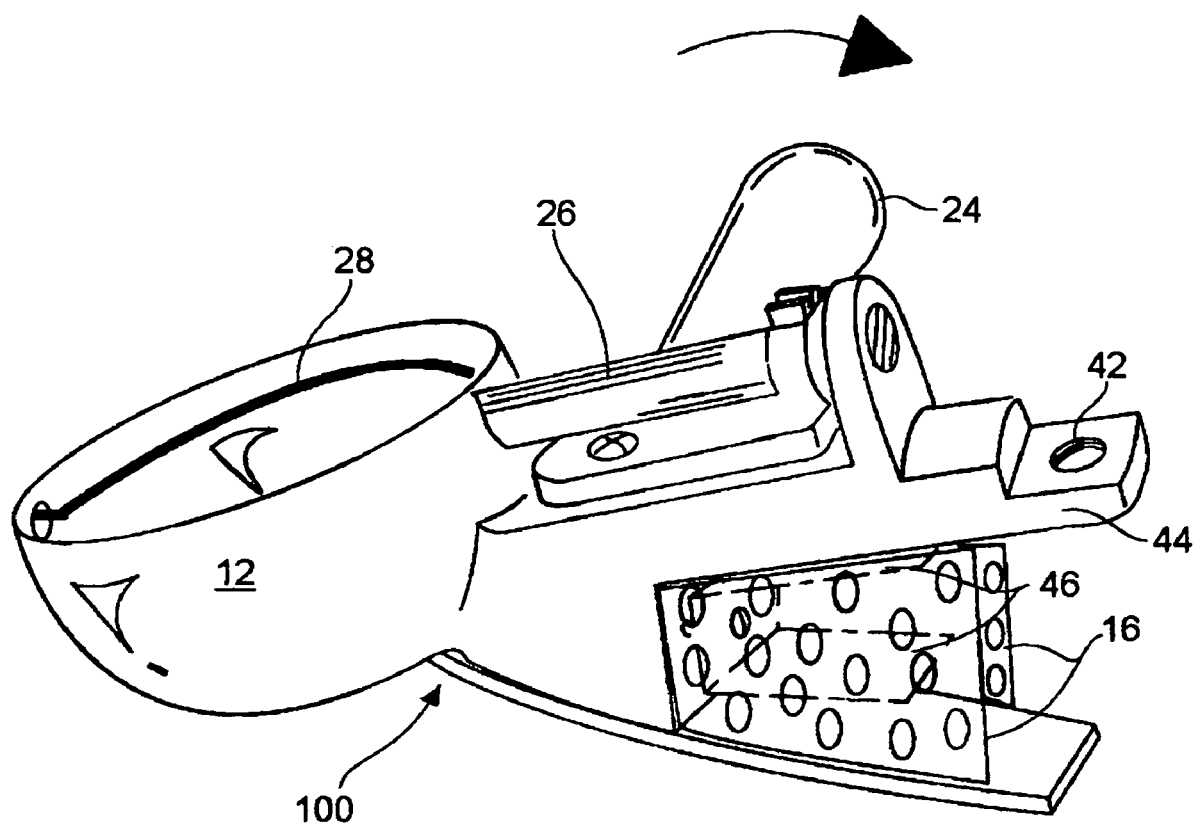
FIG. 3 is a perspective view of one embodiment of the interchangeable heat conducting food serving assembly having the scoop-shaped head portion comprising the heat shield, a protruding portion located at one end of the interchangeable heat conducting food serving assembly for detachably coupling one embodiment of the interchangeable heat conducting food serving assembly to a portion of the handle and a lever coupled to a driveshaft for guiding a semi-circular wire inside an inner portion of a head portion of the heated food serving apparatus of FIG. 1.

An exploded perspective view of the interchangeable heat conducting food serving assembly 100 is shown in FIG. 3. As described above, the scoop-shaped head portion 12 is located at the first end of the interchangeable heat conducting food serving assembly 100 and the heat shield 16 is proximate to the head portion 12 of the interchangeable heat conducting food serving assembly 100. The heat shield 16 forms a portion of the second end of the interchangeable heat conducting food serving assembly 100. The heat shield 16 further comprises a U-clip 46 for enhancing heat transfer when a portion of the interchangeable heat conducting food serving assembly 100 is heated by a flame 48 (see FIGS. 4, 4A and 5) emanating from the torch unit 36. The protruding portion 44 having the threaded hole 42 is located at the second end of the interchangeable heat conducting food serving assembly 100 and adjacent to the heat shield 16. The ledge 52 of a portion of the heat exchange assembly 30 receives the protruding portion 44 (see FIGS. 1, 2, 5 and 6). The lever 24 is coupled to the driveshaft 26 for guiding the substantially semi-circular wire 28 inside an inner portion of the scoop-shaped head portion 12 of the heated food serving apparatus 10.

Referring to FIG. 4, the heat exchange assembly 30 comprises the torch unit 36 coupled to the gas valve 32 located in the first end of the gas container 34. A portion of the second end of the interchangeable heat conducting food serving assembly 100 is heated by the flame 48 emanating from the torch unit 36. The temperature control knob 18 having the access hole 38 for refilling the gas container 34 with the flammable gas (see description above) is coupled to the second end of the gas container 34. The locking screw 40 insures the heat exchange assembly 30 is fixedly coupled to the gas valve 32 for controlling the amount of flammable gas received by the torch unit 36 when the temperature control knob 18 is rotated. A striker arm 56 is coupled to a portion of the surface of the temperature control knob 18. The striker arm 56 has a contoured shape so that when the temperature control knob 18 is rotated, a portion of the surface of the striker arm 56 contacts a plunger portion 74 of a piezo igniter 72 generating a high voltage spark for igniting flammable gas emitted from the torch unit 36 (see FIGS. 5 and 5A). FIG. 4A is an exploded elevational view of the heat exchange assembly 30 of the heated food serving apparatus 10 of FIG. 4 including the torch unit 36 of the heat exchange assembly 30, the flame 48 enclosed by a funnel-shaped flame shield 50 having an air-intake cavity and a further multiplicity of apertures. The multiplicity of apertures of the flame shield 50 and the air-intake cavity of the funnel-shaped flame shield 50 both permit air to be drawn in and mixed with the flammable gas. The flame shield 50 also protects a user of the heated food serving apparatus 10 from the open flame 48 and keeps foodstuffs from coming in direct contact with the flame 48. The flame 48 heats a portion of the interchangeable heat conducting food serving assembly 100.

Figure 5:
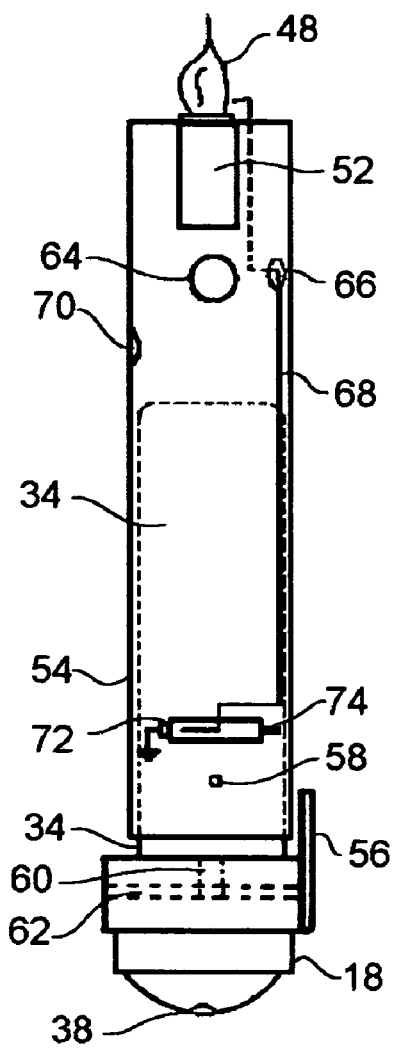
FIG. 5 is an elevational view of an inner portion of the handle of the heated food serving apparatus of FIG. 1 showing a piezo igniter located on a portion of the surface of a concentric sleeve surrounding the refillable gas container for igniting a spark to light the flame of the torch unit and the temperature control knob coupled to the substantially cylindrical refillable gas container with the temperature control knob pulled away from the handle.
Figure 5A:
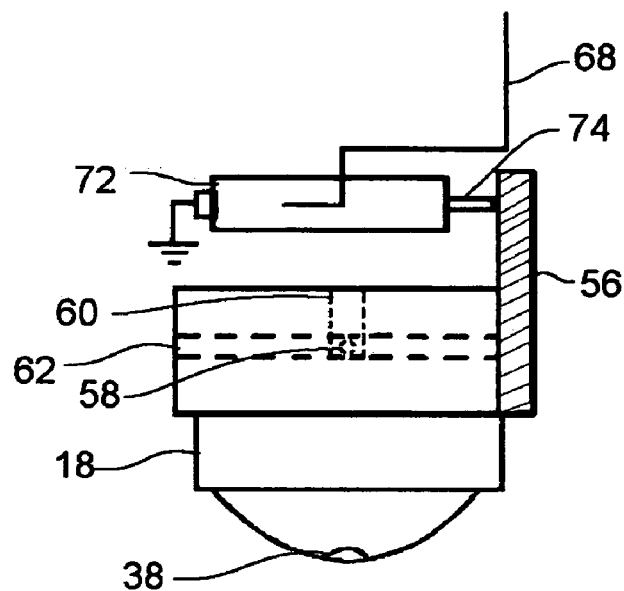
FIG. 5A is an exploded elevational view of an interior portion of the handle of the heated food serving apparatus of FIG. 5 showing the piezo igniter located on a portion of the surface of the concentric sleeve and a plunger portion of the piezo igniter contacting a portion of the surface of a contoured piezo striker arm coupled to a portion of the surface of the temperature control knob.

FIG. 5 shows an inner portion of the handle 14 comprising the substantially cylindrical sleeve 54 which is concentric with the gas container 34 (shown as dotted lines in FIG. 5). An outer portion of the sleeve 54 and an outer portion of the temperature control knob 18 are covered with an insulating material such as polymeric plastic, rubber or the like to insulate the hand of a user of the heated food serving apparatus 10. The insulating material further protects inner components of the handle 14 located on the sleeve 54 and on the temperature control knob 18 and further provides a finished appearance for the handle 14. The temperature control knob 18 located proximate to one end of the sleeve 54 is shown separated from the sleeve 54 to illustrate further features of the temperature control knob 18 coupled to the gas container 34 (see FIG. 5). A portion of the temperature control knob 18 comprises the access hole 38 coupled to the gas container 34 for refilling the gas container 34 with the flammable gas as described above. The temperature control knob 18 has a channel 62 and a keyway slot 60 in an inner portion of the temperature control knob 18 (shown as dotted lines in FIGS. 5 and 5A). When the temperature control knob 18 couples to the sleeve 54, the keyway slot 60 engages a pin 58 on a portion of the surface of the sleeve 54 so that the channel 62 is guided by the pin 58 to permit rotating of the temperature control knob 18. When the pin 58 is coupled to the channel 62, the keyway slot 60 is closed off by a screw (not shown) so as to prevent the temperature control knob 18 from being disengaged from the sleeve 54. The ledge 52 for receiving the interchangeable heat conducting food serving assembly 100 is located on a portion of the heat exchange assembly 30 and proximate to an opposite end of the sleeve 54 (see FIG. 5). The thumb screw opening 64 located in the sleeve 54 is adjacent to the ledge 52 (see description above). An access passage 70 for the locking screw 40 is located on an edge of the sleeve 54 (see FIG. 5). The piezo igniter 72 is coupled to a portion of the surface of the sleeve 54 and the plunger portion 74 of the piezo igniter 72 contacts a portion of the surface of the contoured striker arm 56 to provide a high voltage spark as described above. The piezo igniter 72 is coupled to an insulated wire 68. A portion of the sleeve 54 has a bore 66 for receiving the insulated wire 68 and a non-insulated portion of the insulated wire 68 is located proximate to a mouth of the torch unit 36 so that the flammable gas flowing from the mouth of the torch unit 36 is ignited when the high voltage spark is generated as described above. FIG. 5A is an exploded elevational view showing the plunger portion 74 of the piezo igniter 72 (located on a portion of the surface of the sleeve 54) contacting a portion of the surface of the contoured striker arm 56 coupled to a portion of the temperature control knob 18. FIG. 5A further shows the insulated wire 68 coupled to the piezo igniter 72 and the keyway slot 60 and the channel 62 in an inner portion of the temperature knob 18.

Figure 6A:
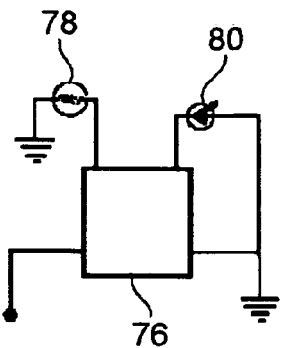
FIG. 6A is a schematic of a circuit diagram for driving the temperature indicating display of FIG. 6 comprising a timer integrated circuit, a thermistor sensor and a light emitting diode.
Figure 6:
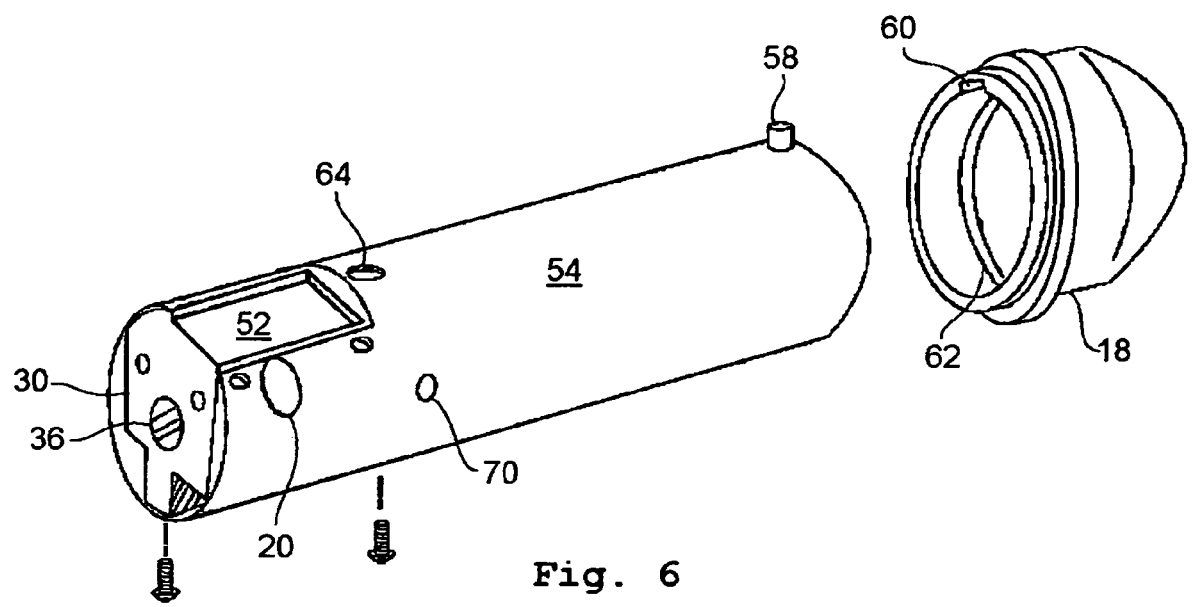
FIG. 6 is a perspective view of an inner portion of the handle of the heated food serving apparatus of FIG. 1 showing a portion of the heat exchange assembly, a temperature indicating display and a ledge for receiving the interchangeable heat conducting food serving assembly located on the concentric sleeve at one end of the handle and a pin located on the concentric sleeve at a second end of the handle for receiving the temperature control knob having a keyway slot.

FIG. 6 is a perspective view of the sleeve 54 showing a portion of the heat exchange assembly 30, the temperature indicating display 20 and the ledge 52 for receiving the interchangeable heat conducting food serving assembly 100 proximate to one end of the sleeve 54 and the pin 58 located on a portion of the surface of the sleeve 54 at the opposite end of the sleeve 54 for receiving the temperature control knob 18 having the keyway slot 60. FIG. 6A is a schematic of a circuit diagram for driving the temperature indicating display 20 comprising a timer integrated circuit 76, a thermistor sensor 78 and a light emitting diode 80.

Figure 7:
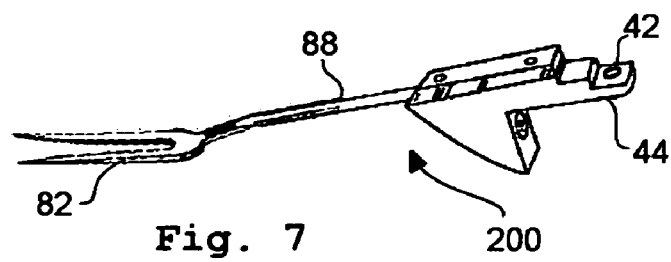
FIG. 7 is a perspective view of a second embodiment of the interchangeable heat conducting food serving assembly having a fork-shaped head portion at one end of the interchangeable heat conducting food serving assembly and the protruding portion at the opposite end of the interchangeable heat conducting food serving assembly for detachably coupling the protruding portion to a portion of the handle of the heated food serving apparatus of FIG. 1.
Figure 8:
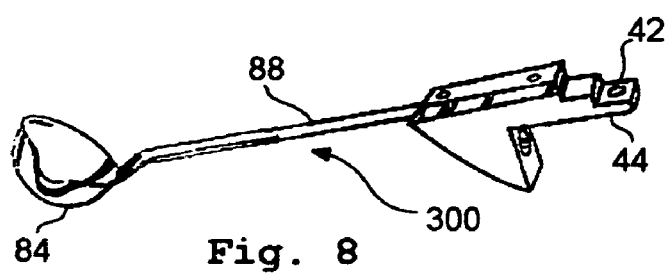
FIG. 8 is a perspective view of a third embodiment of the interchangeable heat conducting food serving assembly having a ladle-shaped head portion at one end of the interchangeable heat conducting food serving assembly and the protruding portion at the opposite end of the interchangeable heat conducting food serving assembly for detachably coupling the protruding portion to a portion of the handle of the heated food serving apparatus of FIG. 1.
Figure 9:
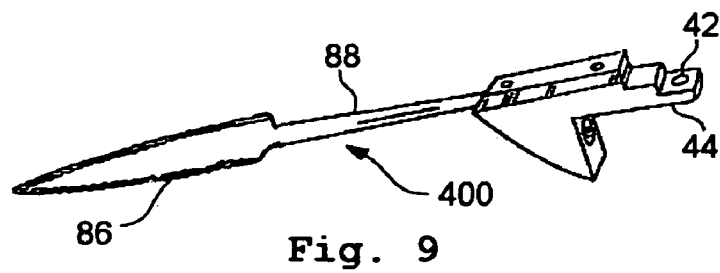
FIG. 9 is a perspective view of a fourth embodiment of the interchangeable heat conducting food serving assembly having a knife-shaped head portion at one end of the interchangeable heat conducting food serving assembly and the protruding portion at the opposite end of the interchangeable heat conducting food serving assembly for detachably coupling the protruding portion to a portion of the handle of the heated food serving apparatus of FIG. 1.
Figure 10:
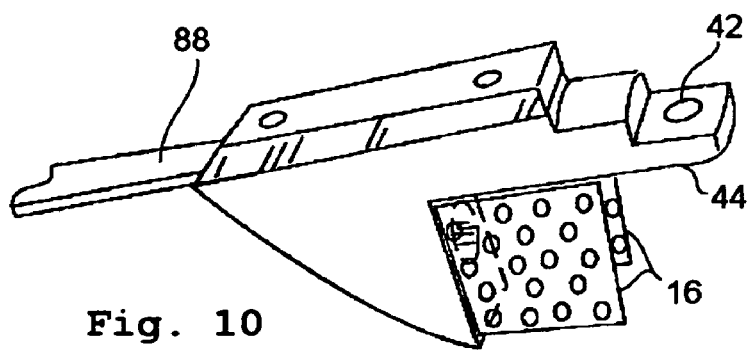
FIG. 10 is an exploded perspective view of one end of any one of the second, or third, or fourth embodiment of the interchangeable heat conducting food serving assembly of FIGS. 7–9 showing a portion of the interchangeable heat conducting food serving assembly coupled to a shaft at one end of the interchangeable heat conducting food serving assembly and the protruding portion at the opposite end of the interchangeable heat conducting food serving assembly for detachably coupling the interchangeable heat conducting food serving assembly to the ledge (not shown) of FIG. 6 of the handle of the heated food serving apparatus of FIG. 1.

FIG. 7 is a perspective view of a second embodiment of an interchangeable heat conducting food serving assembly 200 having a fork-shaped head portion 82 coupled to a shaft 88 at one end of the interchangeable heat conducting food serving assembly 200 and the protruding portion 44 at the opposite end of the interchangeable heat conducting food serving assembly 200 for detachably coupling the protruding portion 44 to the handle 14 of the heated food serving apparatus 10. Similarly, FIG. 8 is a perspective view of a third embodiment of an interchangeable heat conducting food serving assembly 300 having a ladle-shaped head portion 84 couple to the shaft 88 at one end of the interchangeable heat conducting food serving assembly 300 and the protruding portion 44 at the opposite end of the interchangeable heat conducting food serving assembly 300 for detachably coupling the protruding portion 44 to the handle 14 of the heated food serving apparatus 10. Additionally, FIG. 9 is a perspective view of a fourth embodiment of an interchangeable heat conducting food serving assembly 400 having a knife-shaped head portion 86 coupled to the shaft 88 at one end of the interchangeable heat conducting food serving assembly 400 and the protruding portion 44 at the opposite end of the interchangeable heat conducting food serving assembly 400 for detachably coupling the protruding portion 44 to the handle 14 of the heated food serving apparatus 10. FIG. 10 is an exploded perspective view of one end of any one of the second embodiment, or the third embodiment, or the fourth embodiment of the interchangeable heat conducting food serving assembly 200, 300 and 400 of FIGS. 7–9 showing a portion of the interchangeable heat conducting food serving assembly 200, 300 and 400 coupled to the shaft 88 at one end of the interchangeable heat conducting food serving assembly 200, 300 and 400 and the protruding portion 44 at an opposite end of the interchangeable heat conducting food serving assembly 200, 300 and 400 for detachably coupling the interchangeable heat conducting food serving assembly 200, 300 and 400 to the ledge 52 (not shown) of the heat exchange assembly 30 of the heated food serving apparatus 10 as described above for the first embodiment 100. The heat shield 16 is proximate to the shaft 88 and the protruding portion 44 having the threaded hole 42. A portion of the interchangeable heat conducting food serving assembly 200, 300 and 400 is heated by the flame 48 of the torch unit 36 and by conduction to the shaft 88 so that the interchangeable heat conducting food serving assembly achieves a temperature that is desired by a user. The interchangeable heat conducting food serving assembly 200, 300 and 400 may be used in applications other than for manipulating frozen desserts.

Figure 11:
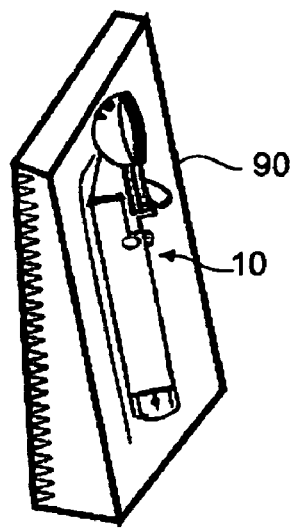
FIG. 11 is a perspective view of a stand for holding the heated food serving apparatus of FIG. 1.

FIG. 11 is a perspective view of a stand 90 for holding the heated food serving apparatus 10. The stand 90 is a heat sink for dispersing heat to mitigate excess temperature build-up while the heat food serving apparatus 10 is not in use.

STATEMENT OF OPERATION OF USE

A user of the heat food serving apparatus 10 selects at least one of the interchangeable accessory assemblies 100, 200, 300 and 400. The protruding portion 44 of the selected interchangeable heat conducting food serving assembly (100, 200, 300 or 400) is detachably coupled to the ledge 52 of the heat exchange assembly 30 using the thumb screw 20. The temperature control knob 18 is rotated, thereby causing the gas valve 32 to open. Substantially simultaneously, a portion of the surface of the striker arm 56 contacts the plunger portion 74 of the piezo igniter 72 causing a high voltage spark for igniting the flammable gas passing through the gas valve 32 and flowing from the refillable gas container 34 resulting in the flame 48.

The size of the flame 48 (and therefore the temperature) of the heat food serving apparatus 10 is controlled by rotating the temperature control knob 18 in an opposite direction to the initial rotation for igniting the flammable gas. The temperature of the heat food serving apparatus 10 may be raised or lowered by rotating the temperature control knob 18 in opposite directions. The user places the heat food serving apparatus 10 in the stand 90 when the heat food serving apparatus 10 is not in use.

When the user is finished using the heat food serving apparatus 10, the temperature knob 18 is rotated to an off position thereby extinguishing the flame 48 because the gas valve 32 is no longer open. The user may refill the gas container 34 by coupling the gas dispenser to the access hole 38 of the temperature control knob 18.

While the invention has been particularly shown and described with reference to preferred embodiments thereof, it will be understood by those skilled in the art that the foregoing and other changes in form and details may be made therein without departing from the spirit and scope of the invention. For example, the interchangeable heat conducting food serving assembly and the stand are made from a conductive material, most preferably a metal such as aluminum and the like. The interchangeable heat conducting food serving assembly may have another food serving shape. Other mechanical means may be used for generating a spark to light the flammable gas. The temperature display may be color-coded to visually indicate when an ideal use temperature has been reached.

What is claimed is:

1. An apparatus for both heating and serving food comprising, in combination: an interchangeable heat conducting food serving assembly having:
    a scoop-shaped head portion at a first end of said interchangeable heat conducting food serving assembly;
    means coupled to at least a portion of said interchangeable heat conducting food serving assembly for heating a back portion of said scoop-shaped head portion at the first end of said interchangeable heat conducting food serving assembly, said means for heating said interchangeable heat conducting food serving assembly comprising a piezo igniter to generate a high voltage spark for igniting flammable gas emitted from a torch unit thereby heating food in contact with said scoop-shaped head portion to facilitate serving the food in contact with said scoop-shaped head portion at the first end of said interchangeable heat conducting food serving assembly; and
    a heat shield located at said back portion of said scoop-shaped head portion and proximate a protruding portion at a second end of said interchangeable heat conducting food serving assembly, said protruding portion defining a threaded hole, said heat shield for moderating heat transfer from said heating means, for protecting a user of said apparatus, and for keeping foodstuffs from coming in direct contact with the heating means, said heat shield having holes and containing a U-clip coupled thereto for enhancing heat transfer when a portion of said interchangeable heat conducting food serving assembly is heated by a flame emanating from said torch unit.

* * * * *